(12) United States Patent
Nakil

(10) Patent No.: US 6,788,700 B1
(45) Date of Patent: Sep. 7, 2004

(54) INTERFACING BETWEEN A NETWORK INTERFACE AND A BUS

(75) Inventor: Harshad Nakil, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/362,263

(22) Filed: Jul. 28, 1999

(51) Int. Cl.[7] .............................................. H04L 12/28
(52) U.S. Cl. ................... 370/419; 370/362; 370/395.1; 370/395.3; 370/395.7; 370/402; 370/423
(58) Field of Search .......................... 370/257, 258, 370/362, 363, 364, 365, 395.1, 395.3, 395.51, 395.6, 395.7, 397, 399, 401, 402, 403, 419, 420, 421, 423

(56) References Cited

U.S. PATENT DOCUMENTS

| | | | | |
|---|---|---|---|---|
| 5,796,732 A | * | 8/1998 | Mazzola et al. | 370/362 |
| 6,049,857 A | * | 4/2000 | Watkins | 711/207 |
| 6,131,119 A | * | 10/2000 | Fukui | 709/224 |
| 6,219,697 B1 | * | 4/2001 | Lawande et al. | 709/221 |
| 6,272,144 B1 | * | 8/2001 | Berenbaum et al. | 370/419 |
| 6,400,682 B1 | * | 6/2002 | Regula | 370/223 |
| 6,470,382 B1 | * | 10/2002 | Wang et al. | 709/220 |
| 2002/0141418 A1 | * | 10/2002 | Ben-Dor et al. | 370/398 |

* cited by examiner

*Primary Examiner*—Dang Ton
*Assistant Examiner*—Shick Hom
(74) *Attorney, Agent, or Firm*—Blakely, Sokoloff, Taylor & Zafman LLP (57) ABSTRACT

A method and apparatus are described for interfacing between a network interface and a bus. For the network interface-to-bus side, the method comprises (a) forming a network address of a message transferred via the network interface to the bus, and (b) mapping the network address to a bus address of the bus, the bus address being within an address space occupied by a bus device coupled to the bus. For the bus-to-network interface side, the method comprises (a) forming a bus index from a bus address of the bus where the bus address is within an address space occupied by a bus device coupled to the bus; and (b) mapping the bus index to a network address of a message transferred via the network interface to the bus.

54 Claims, 8 Drawing Sheets

INTERFACING BETWEEN A NETWORK INTERFACE AND A BUS

FIELD OF THE INVENTION

This invention relates to computer networks. In particular, the invention relates to interfacing between a network interface and a bus.

THE BACKGROUND OF THE INVENTION

Technologies for computer networks have advanced at a fast rate to accommodate the needs for efficient and reliable communication. Designs for computer networks are now becoming complex both in hardware and software. To reduce complexity, most computer networks are organized as a series of layers or protocols, each one built upon the one below it. The function of each layer is to provide certain services to the higher layers, shielding those layers from the specific and detailed implementation of these services.

A network architecture typically follows some reference model to maintain universality and standardization. Examples of important reference models include the broadband Integrated Services Digital Network (B-ISDN) Asynchronous Transfer Mode (ATM), the Open System Interconnection (OSI), and the Transmission Control Protocol/Internet Protocol (TCP/IP) reference models. In general, a network architecture has the following layers: application, transport, network, data link, and physical. In these layers, the actual data transmission takes place in the physical layer.

For ATM communications systems, the Universal Test & Operations PHY Interface for ATM (UTOPIA) parallel data interface is an industry standard for communications between an upper ATM layer module and a Physical Layer module. Thus, vendors providing particular physical layer transceivers often include the physical layer UTOPIA interface as part of their chipset functionality.

Modern microprocessor systems typically have a bus interface to allow bus masters (e.g., the host processor in the system) to communicate with peripheral devices. A particular system bus may become popular due to widespread usage and standardization. Examples of popular buses include the Peripheral Component Interface (PCI), Universal Serial Bus (USB), and 1394 Bus.

SUMMARY OF THE INVENTION

A method and apparatus are described for interfacing between a network interface and a bus.

For the network interface-to-bus side, the method comprises (a) forming a network address of a message transferred via the network interface to the bus, and (b) mapping the network address to a bus address of the bus, the bus address being within an address space occupied by a bus device coupled to the bus.

For the bus-to-network interface side, the method comprises (a) forming a bus index from a bus address of the bus where the bus address is within an address space occupied by a bus device coupled to the bus; and (b) mapping the bus index to a network address of a message transferred via the network interface to the bus.

Other features and advantages of the invention will be apparent from the detailed description and drawings provided herein.

BRIEF DESCRIPTION OF THE DRAWINGS

The present invention is illustrated by way of example and not limitation in the figures of the accompanying drawings in which like references indicated similar elements which.

DETAILED DESCRIPTION

A method and apparatus are described for interfacing a network interface and a bus. An address mapping scheme maps the network address to the bus address and vice versa. The scheme allows information exchanges among multiple network devices connected to the bus without going through the system memory. The technique provides an efficient utilization of the bus bandwidth and allows network devices to communicate via the peripheral bus.

In the following description, the ATM model and the PCI bus are merely used as an interface example. It is contemplated that the technique is applicable to other models, buses, or network architectures with similar characteristics.

ATM technology provides a high level of services to data communication. The basic idea of ATM is to transmit information in small, fixed-size packets called cells. The cells are 53 bytes long, of which 5 bytes are header and 48 bytes are payload. The advantages of using cell-switching technology in ATM includes flexibility in accommodating both constant and variable rate traffic, high speeds of data transfers, and broadcasting ability.

An ATM network architecture includes a physical layer, an ATM layer, and an ATM adaptation layer. The physical layer deals with the physical medium. The ATM layer deals with cells and cell transport, including congestion control. The ATM adaptation layer provides segmentation and re-assembly of packets of cells. The UTOPIA is an interface between an upper ATM layer module and a physical layer module. When the UTOPIA is interfaced to a system having a processor with a peripheral bus, an interface circuit between the UTOPIA and such a peripheral bus is necessary. When there are multiple network devices that are connected to the peripheral bus, this interface circuit allows these network devices to exchange messages over the peripheral bus.

Figure 1:
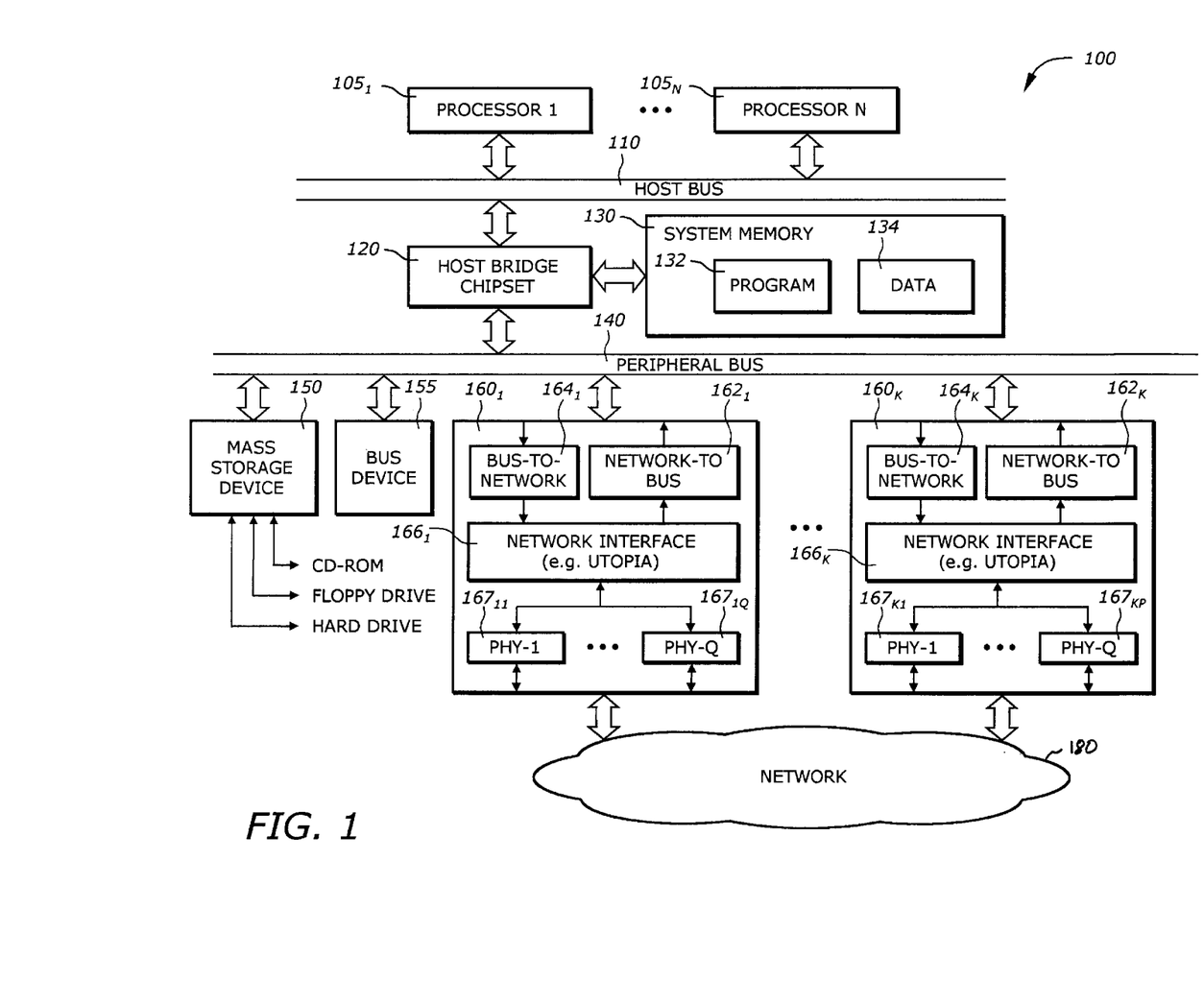
FIG. 1 shows a system in which one embodiment of the invention can be practiced.

FIG. 1 is a diagram illustrating a computer system 100 in which one embodiment of the invention can be practiced. The computer system 100 include N processors $105_1$ to $105_N$, a host bus 110, a host bridge chipset 120, a system memory 130, a peripheral bus 140, a mass storage device 150, a bus device 155, and K network interface processors $160_1$ to $160_K$.

Each of the N processors $105_1$ to $105_N$ represents a central processing unit of any type of architecture, such as complex instruction set computers (CISC), reduced instruction set computers (RISC), very long instruction word (VLIW), explicitly parallel instruction set computing (EPIC), or hybrid architecture. Various embodiments of the invention could be implemented on a multi-processor or single processor computer system.

The host bridge chipset 120 includes a number of interface circuits to allow each of the N processors $105_1$ to $105_N$ access to the system memory 130 and the peripheral bus 140. The system memory 130 represents one or more mechanisms for storing information. For example, the system memory 130 may include non-volatile or volatile memories. Examples of these memories include flash memory, read only memory (ROM), or random access memory (RAM). The system memory 130 includes program 132 and data 134. Of course, the system memory 130 preferably contains additional software (not shown), which is not necessary to understanding the invention.

The peripheral bus 140 is a bus that allows each of the N processors $105_1$ to $105_N$ communicate with the peripheral devices coupled to the peripheral bus 140. Examples of the peripheral bus include the peripheral component interconnect (PCI). The mass storage device 150 includes CD ROM, floppy diskettes, and hard drives. The bus device 155 represents a typical peripheral device coupled to the peripheral bus 140 such as a video card, and audio control device, a input/output (I/O) controller.

Each of the network interface processors $160_1$ to $160_K$ is a device to provide interface to a network 180. These processors are typically the same and therefore a discussion on the network interface processor $160_1$ can be applicable for all of them. The network interface processor $160_1$ includes a network-to-bus circuit $162_1$, a bus-to-network circuit $164_1$, and a network interface $166_1$. The network-to-bus circuit $162_1$ provides an interface from the network interface $166_1$ to the peripheral bus 140. The bus-to-network circuit $164_1$ provide an interface from the peripheral bus 140 to the network interface $166_1$. The network-to-bus circuit $162_i$ and the bus-to-network circuit $164_i$ where i=1, ... , K allow the corresponding network interface processors $160_1$ to $160_K$ to exchange messages without going through the system memory 130. For example, the ATM cells are sent across the peripheral bus 140 without going to the system memory 130. The bus utilization is therefore efficient because the cells travel only once in the communication.

The network interface $166_1$ provides an interface between the peripheral bus 140 and the physical layer of the network 180. An example of such an interface is the UTOPIA. The network interface 166, is connected to Q physical layer elements or devices $167_1$ to $167_Q$. The physical layer elements or devices $167_1$ to $167_Q$ are interfaced to the network 180. The network 180 includes to routers and or switches (not shown) to transfer messages. Each of these routers provides routing control to messages to and from the remote computers.

Figure 2:
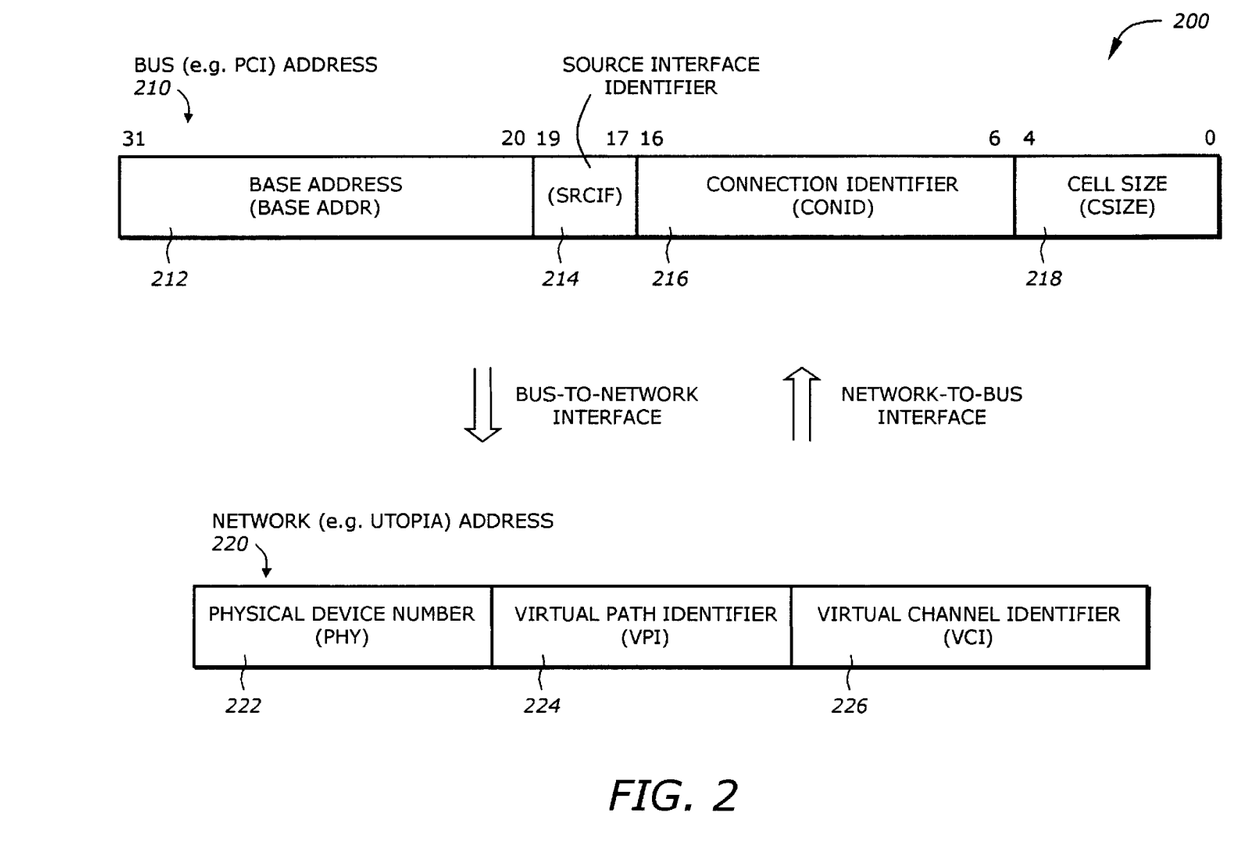
FIG. 2 shows bus and network interface address formats according to one embodiment of the invention.

FIG. 2 shows bus and network interface address formats according to one embodiment of the invention. The formats include the bus address format 210 and the network address format 220.

The bus address format 210 has a base address field 212, a source interface identifier field 214, a connection identifier field 216, and a cell size field 218. In one embodiment, the bus is the PCI bus and the bus address format 210 has 32 bits. The base address field 212 has a field width of 12 bits from bit 20 to bit 31 corresponding to the base address (BASE ADDR) of the PCI address space of the network interface processors $160_1$ to $160_K$ shown in FIG. 1. The source interface identifier field 210 has a field width of 3 bits from bit 17 to bit 19 corresponding to the source interface identifier (SRCIF). The connection identifier field 216 has a field width of 11 bits from bit 6 to bit 16 corresponding to the connection identifier (CONID). The cell size field 218 has a field width of 6 bits from bit 0 to bit 5 corresponding to the cell size (CSIZE) of the message. In alternative embodiments, the assignment of the address bits can be modified according to the specific implementation.

The BASE ADDR provides the base or starting address of the PCI device in the memory address space of the processors $105_1$ to $105_N$ shown in FIG. 1. In the embodiment shown in FIG. 2, the network interface processors $160_1$ to $160_K$ each occupies an address space of 1 megabytes (MB) corresponding to bits 0 to 19. The BASE ADDR provides the starting address of this 1 MB memory space.

The SRCIF provides an identifier of a specific PCI device from the network interface processors $160_1$ to $160_K$ that is selected to originate the message transferred over the PCI bus. In the embodiment shown in FIG. 2, the SRCIF has 3 bits corresponding to 8 PCI devices, i.e., K=8. Alternative embodiments may use the SRCIF as an identifier of a specific PCI device to receive the message transferred over the PCI bus. The SRCIF may be further expanded to include the identifiers of both the source and destination bus devices.

The CONID provides an identifier of a connection for the network interface. In the embodiment shown in FIG. 2, the CONID has 11 bits corresponding to 2K connections. The CONID and the SRCIF together provide an effective number of connections of 16K.

The CSIZE provides the size of a cell in the message transferred via the network interface. In the embodiment shown in FIG. 2, the CSIZE has 6 bits corresponding to a cell size of 64 bytes.

The network address format 220 has a physical device number field 222, a virtual path identifier field 224, and a virtual channel identifier field 226. In one embodiment, the network is the ATM and the network interface is the UTOPIA. The physical device number field 222 has a field width of 5 bits corresponding to the physical device number (PHY). The virtual path identifier field 224 has a field width of 8 bits corresponding to the virtual path identifier (VPI). The virtual channel identifier field 226 has a field width of 16 bits or 12 bits depending on whether the network interface is a User Network Interface (UNI) or a Network-Network Interface (NNI) interface, respectively. The virtual channel identifier field 226 corresponds to the virtual channel identifier (VCI).

The PHY provides the physical device number addressed by the network interface. In one embodiment, the PHY has 5 bits corresponding to 32 physical devices. The VPI and the VCI define a connection in a virtual circuit for the ATM. The VPI identifies a unidirectional transport of ATM cells belonging to a bundle of virtual channels. The VCI describes a unidirectional transport of ATM cells.

The space occupied by such a network address is quite large. In most cases, however, only a small subset of this space is utilized. In practical systems, it is therefore sufficient to provide a compressed address space for the network address without loss of functionality. The bus and network address formats shown in FIG. 2 can be used to support a network-to-bus interface and a bus-to-network interface with simple and efficient hardware.

Figure 3A:
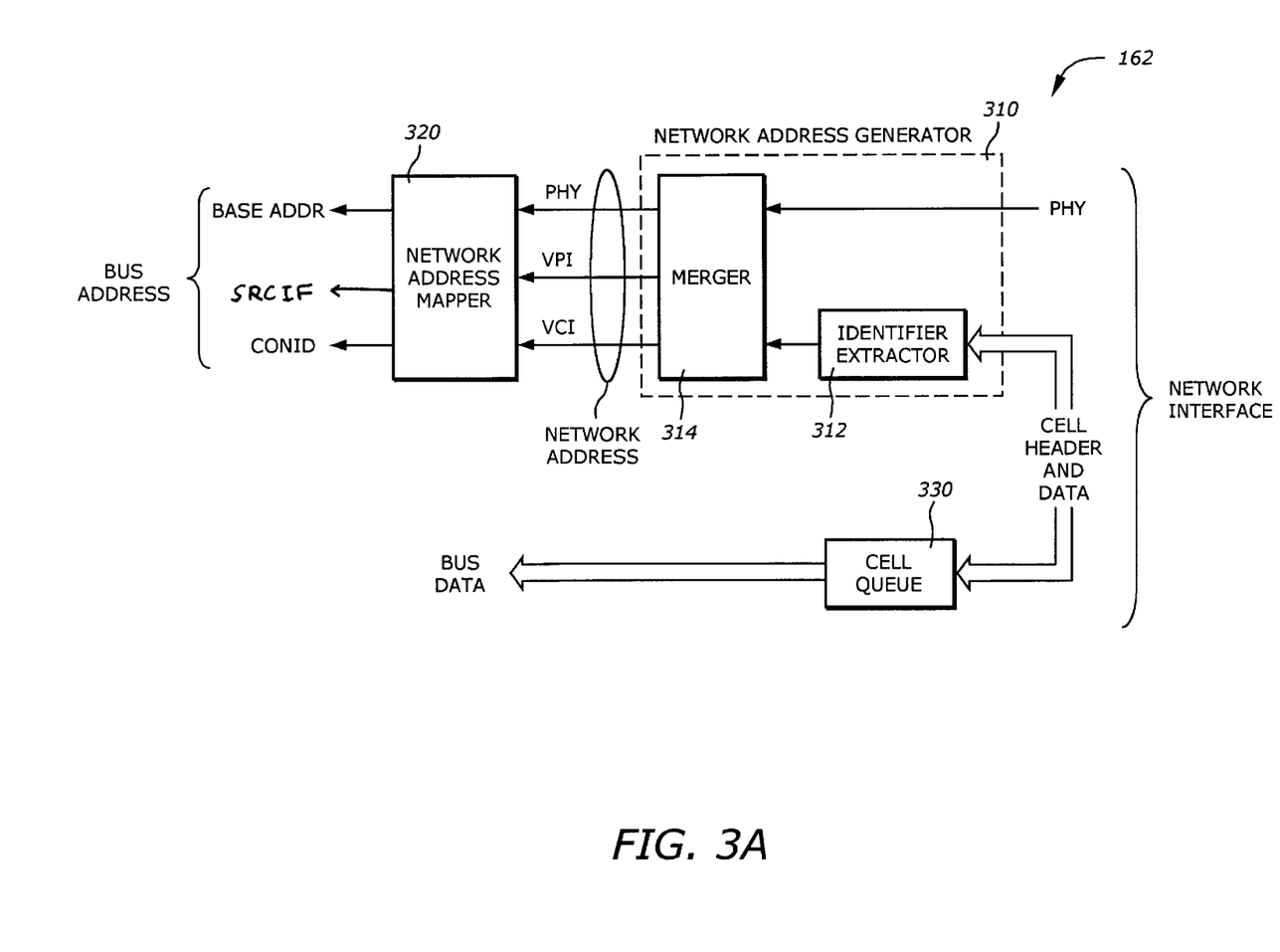
FIG. 3A shows a network-to-bus interface.

FIG. 3A shows a network-to-bus interface 162 according to one embodiment of the invention. The network-to-bus interface 162 includes a network address generator 310, a network address mapper 320, and a cell queue 330.

The network address generator 310 decodes the information sent from the network interface to form a network address. The network address generator 310 includes an identifier extractor 312 and a merger 314. The identifier extractor 312 extracts at least one identifier from a cell header embedded in the message sent from the network interface. In one embodiment, the network interface is the UTOPIA and the identifiers to be extracted are the VPI and the VCI. The merger 314 merges the physical device number PHY from the network interface with the extracted identifiers. The merger 314 may be simply implemented as direct wire connections from the PHY lines together with the extracted identifier lines VPI and VCI. The network address thus includes the PHY, VPI, and VCI. In a typical ATM connection, the network address has a total of 29 lines for a UNI connection (5 lines for PHY, 8 lines for VPI, and 16 lines for VCI) or 25 lines for an NNI connection (5 lines for PHY, 8 lines for VPI, and 12 lines for VCI).

The network address mapper 320 maps the network address to the bus address that corresponds to the bus device. The bus address includes the BASE ADDR, SRCIF, and the CONID as shown in FIG. 2. The SRCIF can be generated in a number of ways. Each device in the system has its own unique identification. The SRCIF can be programmed by the processor during initialization and stored in RAM, programmed during manufacturing and stored in ROM, or hardwired according to the slot number in the router. The device knows this number and inserts in as part of the bus address when it transmits a cell. There are two methods to implement the network address mapper 320 to generate the BASE ADDR and the CONID as will be explained later in FIGS. 3B and 3C.

The cell queue 330 receives the cell data sent from the network interface. The cell queue 330 can be implemented by a first-in-first-out (FIFO) memory.

Figure 3B:
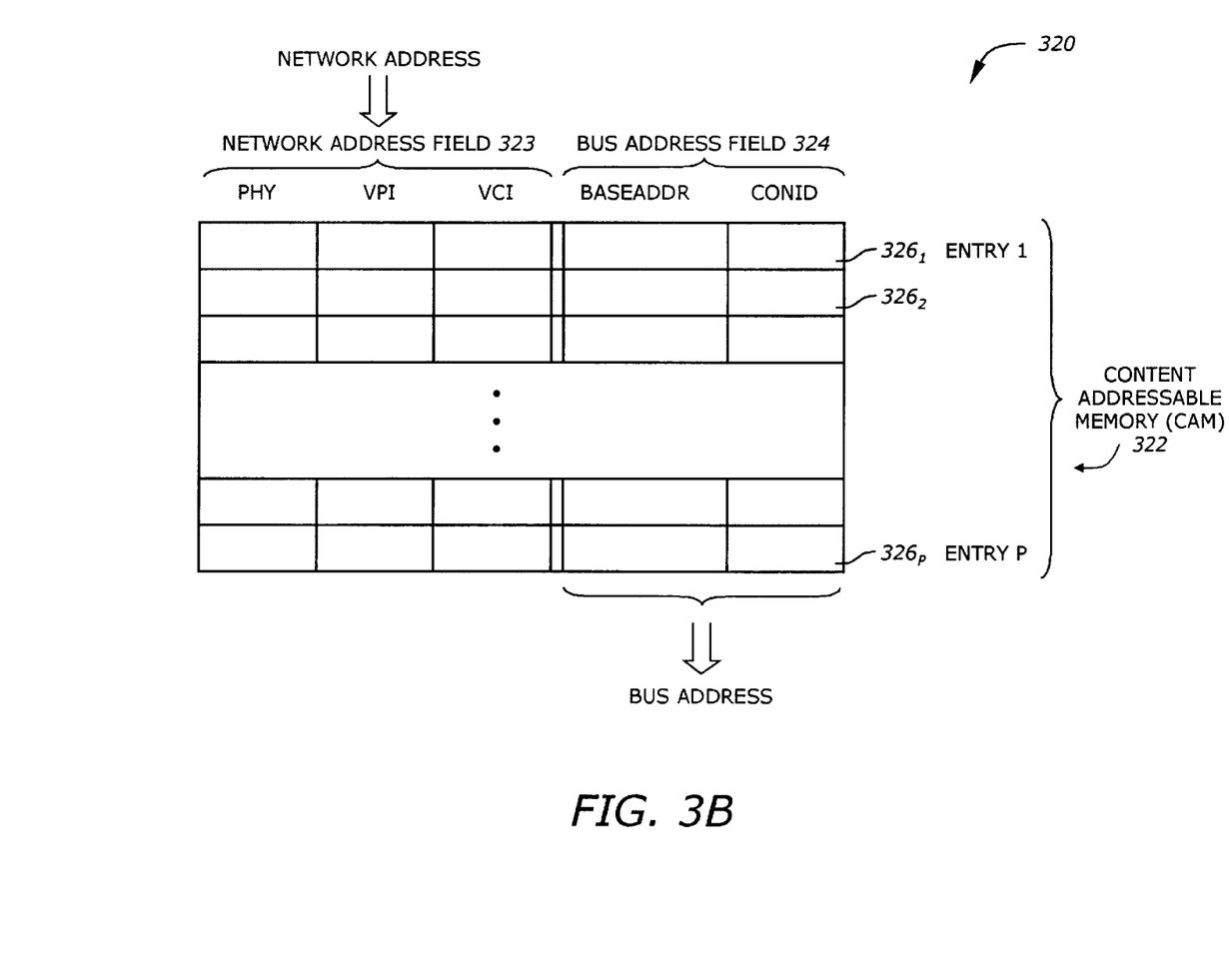
FIG. 3B shows a content addressable memory for the network address mapper.

FIG. 3B shows a content addressable memory 322 for the network address mapper 320 shown in FIG. 3A. The content addressable memory (CAM) 322 has P entries $326_1$ to $326_P$. The number of entries P is determined based on some system criteria such as the number of virtual paths or virtual channels used in the particular ATM connection system.

Each of the entries $326_1$ to $326_P$ has at least two fields: a network address field 323 and a bus address field 324. The bus address field 324 contains the bus address corresponding to the network address in the network address field 323. In one embodiment, the network is the ATM and the bus is the PCI. The network address field 323 has three subfields PHY, VPI, and VCI and the bus address field 324 has two subfields BASE ADDR and CONID.

The network address is presented to the CAM 322. The CAM 322 matches the presented network address with the network address field 323. If there is a match, the corresponding bus address field in the entry is retrieved to provide the bus address. If there is no match, the CAM 322 returns an error signal.

Figure 3C:
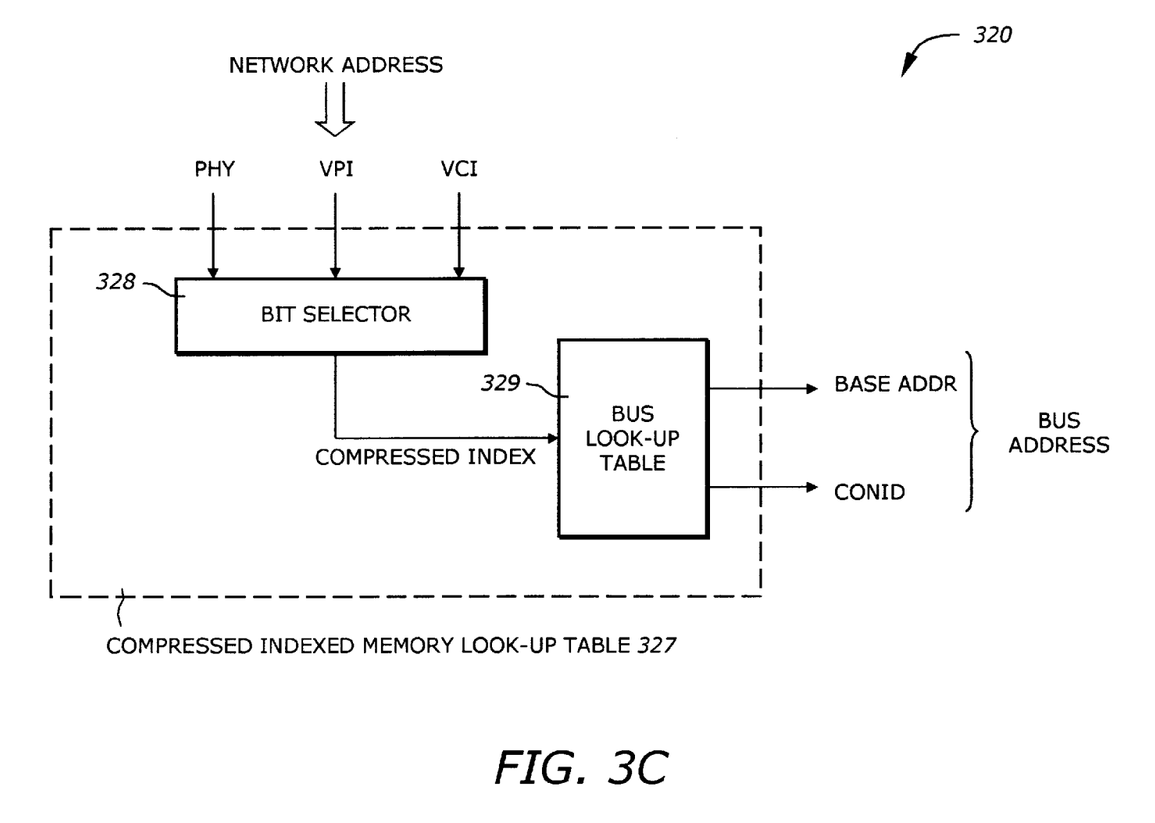
FIG. 3C shows a compressed indexed memory look-up table for the network address mapper.

FIG. 3C shows a compressed indexed memory look-up table (LUT) 327 for the network address mapper 320 shown in FIG. 3. The compressed Aindexed memory LUT 327 includes a bit selector 328 and a bus LUT 329.

The bit selector 328 selects bits from the network address and generates a compressed index. The compressed index represents a smaller address space than that of the complete network address. There are a number of methods to implement the bit selector 328. One simple method is merely to hardwire the selected lines directly to form the compressed index. Another method is to use a multiplexer or multiplexers to select the network address lines. The size of the compressed index depends on the connection platform configuration. For example, if it is desired to have only 8 physical device numbers, 32 virtual path identifiers, and 1K virtual channel identifiers, then the compressed index takes 3 lines from the PHY, 5 lines from the VPI, and 10 lines from the VCI to form a 18-bit compressed index.

The bus LUT 329 is a memory used as a look up table. A look-up table is a simple form of a hash table. The compressed index is used to address the memory. The contents of the memory at a particular address is the corresponding bus address of the compressed index. In one embodiment, the bus is a PCI bus and the bus address includes a 12-bit BASE ADDR and 11-bit CONID. Then the word size of the bus LUT 329 is 23-bit. The bus LUT 329 may be implemented as a static random access memory (SRAM), a read only memory (ROM), a programmable ROM (PROM), or a flash memory. As is known by one of ordinary skill in the art, the bus LUT 329 may also be implemented by other more complex hashing algorithms.

Figure 4:
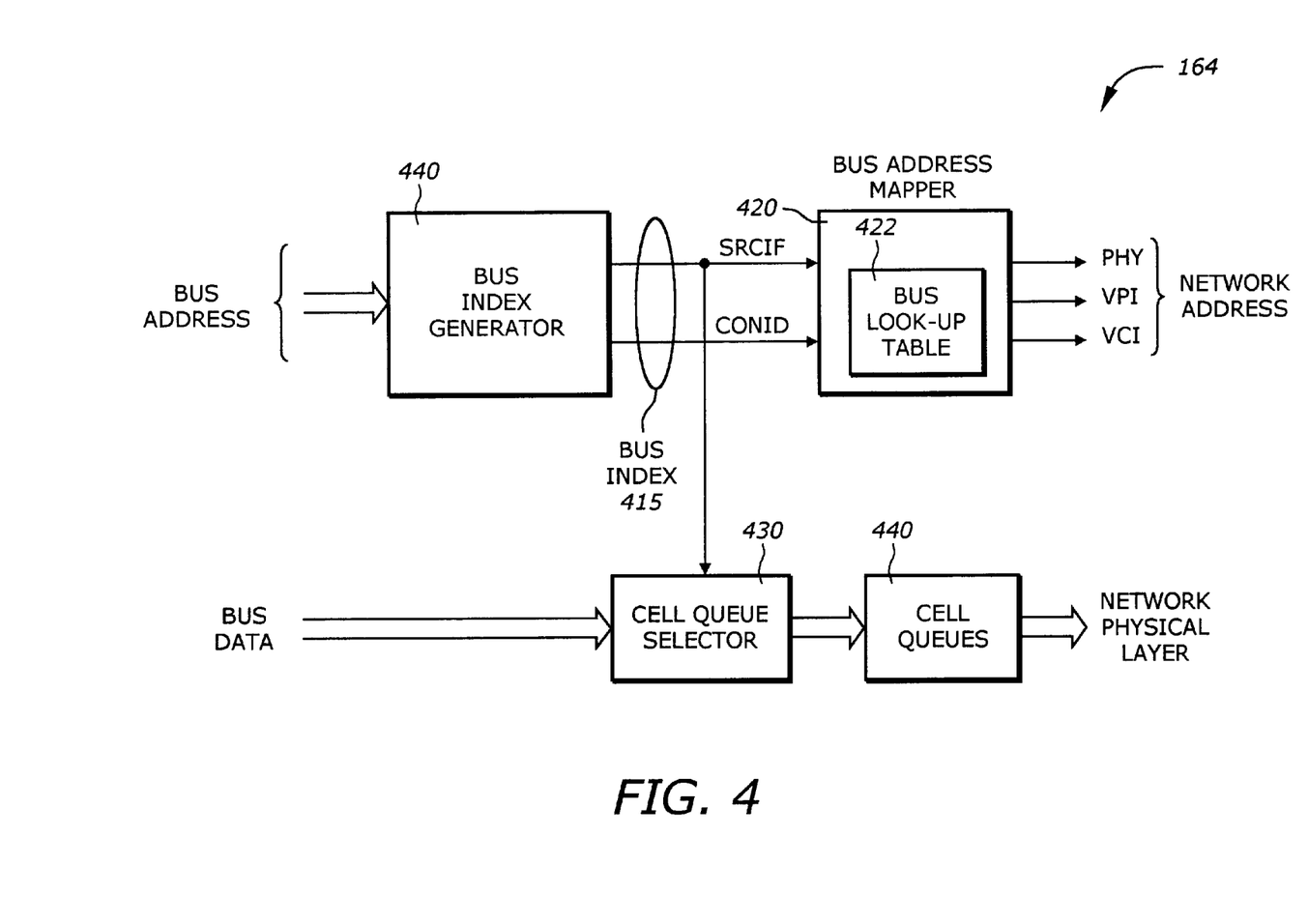
FIG. 4 shows a bus-to-network interface.

FIG. 4 shows a bus-to-network interface 164 according to one embodiment of the invention. The bus-to-network interface 164 converts the bus address from the bus to the network address. The bus-to-network interface 164 includes a bus index generator 410, a bus address mapper 420, a cell queue selector 430, and a cell queue 440.

The bus index generator 410 receives the bus address as generated by a bus master (e.g., the host processor 105 in FIG. 1) on the bus, and forms a bus index 415. For example, when the bus is a PCI bus, the bus index generator 410 extracts the SRCIF and the CONID to form the bus index 415.

The bus address mapper 420 receives the bus index 415 from the bus index generator 410 and generates the corresponding bus address. In one embodiment, the bus address mapper 420 includes a bus LUT 422. The bus LUT 422 is a LUT memory storing elements of the network address, such as the PHY, VPI, and VCI. The bus LUT 422 may be implemented as a static random access memory (SRAM), a read only memory (ROM), a programmable ROM (PROM), or a flash memory. The bus index 415 is used to address the bus LUT 422. Again, a LUT is a simple form of a hash table. Other more complex hashing algorithms may be used to implement the bus LUT 422.

The cell queue selector 430 selects or enables the cell queue 440 using the SRCIF. The cell queue selector 430 may be a decoder that decodes the SRCIF into an enable or select signal which is used to enable a bus buffer of the bus data and the cell queue 440 to receive the data from the peripheral bus. The cell queue 440 and the cell queue selector 430 allows incomplete bursts from the peripheral bus (e.g., a transmission of less than a complete ATM cell in a single burst). The cell queue selector 430 is used to avoid mixing the cells in the queue and ensure that data sent to a device are properly assembled.

Figure 5:
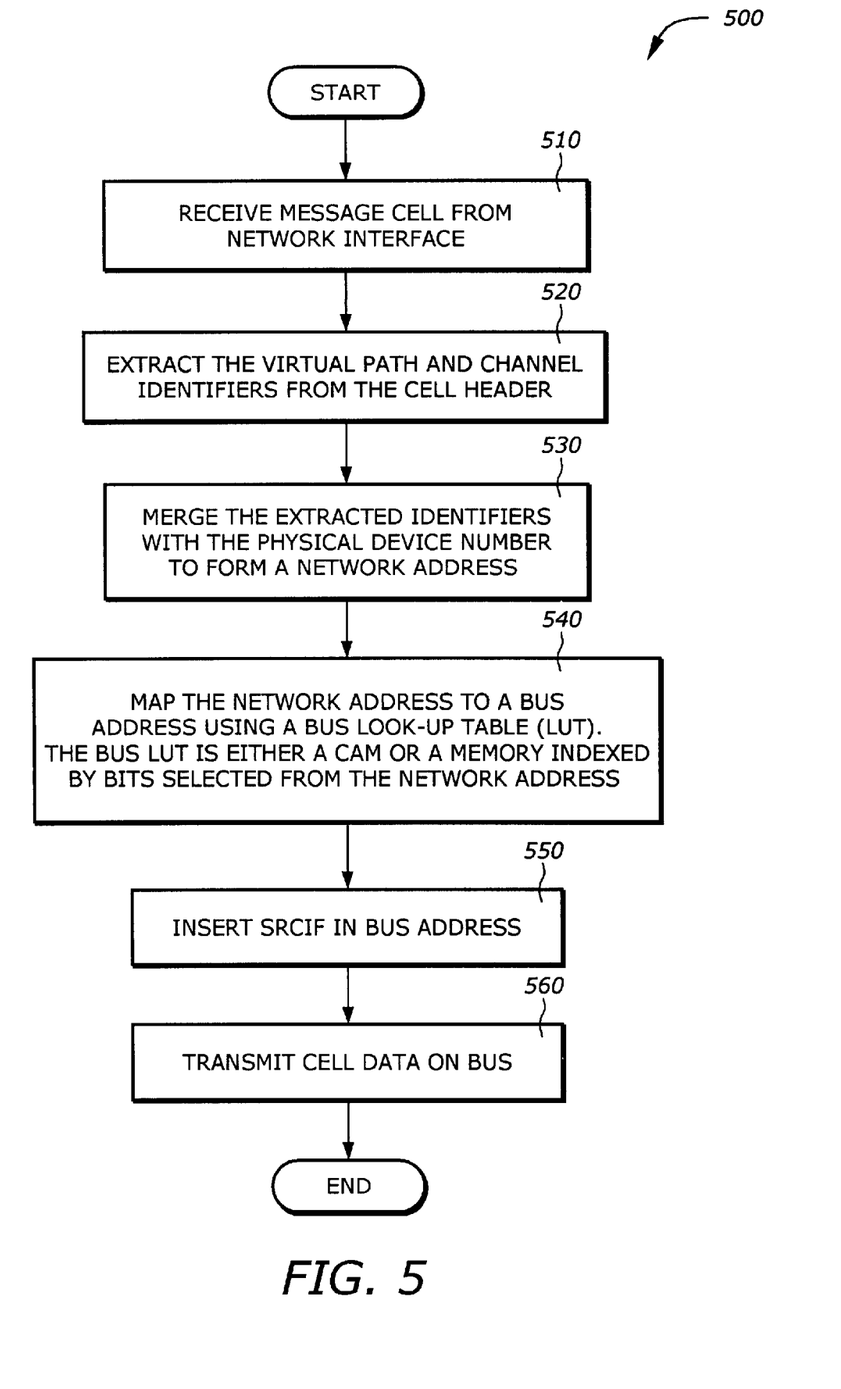
FIG. 5 shows a flowchart for a process to interface a network interface to a bus.

FIG. 5 shows a flowchart for a process 500 to interface between a network to a bus according to one embodiment of the invention.

Upon START, the process 500 receives a message cell from the network interface (Block 510). The message cell contains information about the connection such as the nature of the connection and the virtual path and channel identifiers. The process 500 extracts the VPI and the VCI from the cell header (Block 520). The process 500 then merges or combines the extracted VPI and VCI with the physical device number (PHY) to form a network address (Block 530).

Then the process 500 maps the network address to a bus address using a bus look-up table (LUT) (Block 540). The bus LUT is either a CAM or a memory indexed by the bits selected from the network address. Next, the process 500 inserts the source identifier SCRIF in the bus address (Block 550). Then the process 500 transmits the data from the cell queue on the bus (Block 560). Then the process 500 is terminated.

Figure 6:
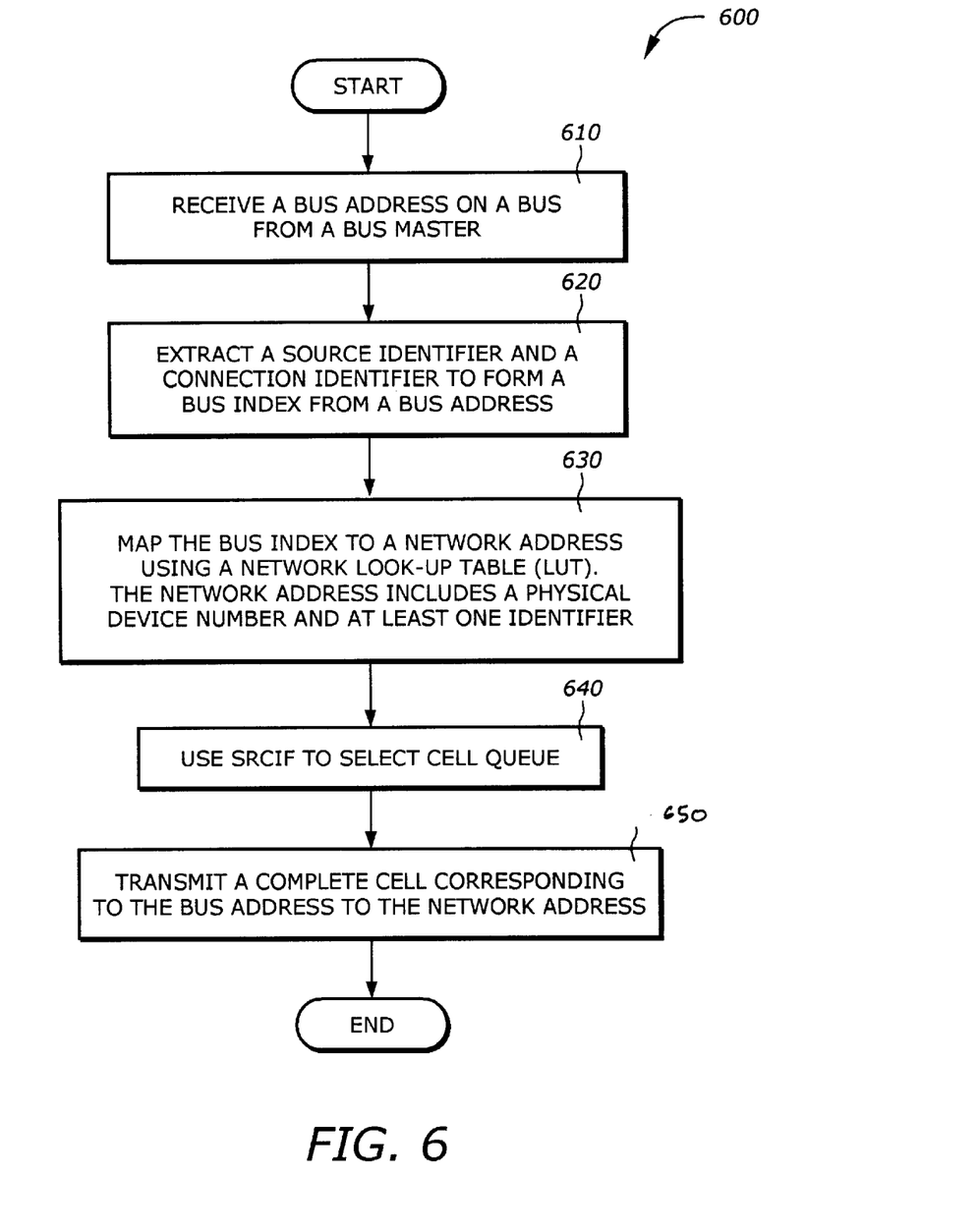
FIG. 6 shows a flowchart for a process to interface a bus to a network interface.

FIG. 6 shows a flowchart for a process 600 to interface a bus to a network interface according to one embodiment of the invention.

Upon START, the process 600 receives a bus address generated by a bus master from the bus (Block 610). Then the process 620 extracts a source identifier and a connection identifier from the bus address to form a bus index (Block 620). Next, the process 600 maps the bus index to a network address using a network LUT (Block 630). The network address includes a physical device number and at least one identifier. The identifier includes the VPI and VCI.

Next, the process 600 uses the source identifier (SCRIF) embedded in the bus address to select the queue (Block 640). Then the process 600 transmits data from the selected cell queue to the network address (Block 650). The number of bytes to be transmitted is defined by the cell size field in the format, such as the CSIZE shown in FIG. 2. Then the process 600 is terminated.

A technique has been described to interface between a network interface and a bus. An example of the network interface is the UTOPIA and an example of the bus is the PCI bus. The technique uses an address mapper to translate or convert a network address to a bus address and vice versa. The address mapper is implemented by a look-up table. The technique is simple and efficient to allow messages to be exchanged among the network devices connected to the bus.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for interfacing between a network interface and a bus, the method comprising:

forming a fist network address of a first message transferred via the network interface to the bus; and mapping the first network address to a first bus address of the bus, the first bus address being within an address space occupied by a bus device coupled to the bus, the mapping comprising looking up the first bus address from a bus look-up table; wherein the bus look-up table is a memory indexed by a compressed index, the compressed index being formed by bits selected from the network address.

2. The method of claim 1 wherein the forming the first network address comprises:

extracting a destination identifier from the first message; and merging the extracted destination identifier with a physical device number to generate the first network address, the physical device number corresponding to the bus device.

3. The method of claim 2 wherein the extracting comprises:

extracting at least one identifier from a header of the first message, the at least one identifier corresponding to the destination identifier.

4. The method of claim 1 wherein the bus look-up table is a content addressable memory, the first network address and the first bus address being an entry in the content addressable memory.

5. The method of claim 1 wherein the first bus address includes a base address and a first connection identifier.

6. The method of claim 3 wherein the network interface is a Universal Test and Operations physical layer interface for ATM (UTOPIA).

7. The method of claim 6 wherein the at least one identifier includes a virtual path identifier and a virtual channel identifier.

8. The method of claim 7 wherein the bus is a peripheral component interconnect (PCI) bus.

9. The method of claim 1 further comprising: receiving data from the bus in a cell queue.

10. The method of claim 1 further comprising:

forming a bus index from a second bus address of the bus; and mapping the bus index to a second network address of a second message transferred via the network interface to the bus.

11. The method of claim 10 wherein the forming the bus index comprises:

extracting a source identifier and a second connection identifier from the second bus address to generate the bus index.

12. The method of claim 10 wherein the mapping the bus index comprises:

looking up the second network address from a network look-up table.

13. The method of claim 12 wherein the network look-up table is a memory indexed by the bus index.

14. The method of claim 12 wherein the second network address includes a physical device number and at least one identifier.

15. The method of claim 14 wherein the at least one identifier includes a virtual path identifier and a virtual channel identifier.

16. The method of claim 11 further comprising:

transmitting data stored in a cell queue to the network interface, the cell queue being selected by the source identifier.

17. An apparatus for interfacing between a network interface and a bus, the apparatus comprising:

a network address generator coupled to the network interface to form a first network address of a first message transferred via the network interface to the bus; and a network address mapper coupled to the network address generator to map the network address to a first bus address of the bus, the first bus address being within an address space occupied by a bus device coupled to the bus, the address mapper comprising a bus look-up table to provide the first bus address; wherein the bus look-up table is a memory indexed by a compressed index, the compressed index being formed by bits selected from the first network address.

18. The apparatus of claim 17 wherein the network address generator comprises:

an identifier extractor to extract a destination identifier from the first message; and a merger coupled to the identifier extractor to merge the extracted destination identifier with a physical device number to generate the first network address, the physical device number corresponding to the bus device.

19. The apparatus of claim 18 wherein the identifier extractor extracts at least one identifier from a header of the first message, the at least one identifier corresponding to the destination identifier.

20. The apparatus of claim 19 wherein the network interface is a Universal Test and Operations physical layer interface for ATM (UTOPIA).

21. The apparatus of claim 20 wherein the at least one identifier includes a virtual path identifier and a virtual channel identifier.

22. The apparatus of claim 21 wherein the bus is a peripheral component interconnect (PCI) bus.

23. The apparatus of claim 17 further comprising:
a cell queue to receive data from the bus.

24. The apparatus of claim 17 further comprising:
a bus index generator to form a bus index from a second bus address of the bus; and
a bus address mapper coupled to the bus index generator to map the bus index to a second network address of a second message transferred via the network interface from the bus.

25. The apparatus of claim 24 wherein the bus index generator extracts a source identifier and a second connection identifier from the second bus address to generate the bus index.

26. The apparatus of claim 24 wherein the bus address mapper comprises:
a network look-up table to provide the second network address.

27. The apparatus of claim 26 wherein the network look-up table is a memory indexed by the bus index.

28. The apparatus of claim 26 wherein the second network address includes a physical device number and at least one identifier.

29. The apparatus of claim 28 wherein the at least one identifier includes a virtual path identifier and a virtual channel identifier.

30. The apparatus of claim 25 further comprising:
a cell queue to transmit data to the network interface; and
a cell queue selector coupled to the bus index generator and the bus to select the cell queue corresponding to the source identifier.

31. The apparatus of claim 17 wherein the first bus address includes a base address and a first connection identifier.

32. The apparatus of claim 31 wherein the bus look-up table is a content addressable memory, the first network address and the first bus address being an entry in the content addressable memory.

33. A system comprising:
a processor;
a bus coupled to the processor; and
a circuit for interfacing between a network interface and the bus, the circuit comprising:
a network address generator coupled to the network interface to form a first network address of a first message transferred via the network interface to the bus, and
a network address mapper coupled to the network address generator to map the first network address to a first bus address of the bus, the first bus address being within an address space occupied by a bus device coupled to the bus, the address mapper comprising a bus look-up table to provide the first bus address; wherein the bus look-up table is a memory indexed by a compressed index, the compressed index being formed by bits selected from the first network address.

34. The system of claim 33 wherein the network address generator comprises:
an identifier extractor to extract a destination identifier from the first message; and
a merger coupled to the identifier extractor to merge the extracted destination identifier with a physical device number to generate the first network address, the physical device number corresponding to the bus device.

35. The system of claim 34 wherein the identifier extractor extracts at least one identifier from a header of the first message, the at least one identifier corresponding to the destination identifier.

36. The system of claim 35 wherein the network interface is a Universal Test and Operations physical layer interface for ATM (UTOPIA).

37. The system of claim 33 wherein bus is a peripheral component interconnect (PCI) bus.

38. The system of claim 33 wherein the circuit further comprising:
a cell queue to receive data from the bus.

39. The system of claim 33 wherein the circuit further comprises
a bus index generator to form a bus index from a second bus address of the bus; and
a bus address mapper coupled to the bus index generator to map the bus index to a second network address of a second message transferred via the network interface from the bus.

40. The system of claim 39 wherein the bus index generator extracts a source identifier and a second connection identifier from the second bus address to generate the bus index.

41. The system of claim 39 wherein the bus address mapper comprises:
a network look-up table to provide the second network address.

42. The system of claim 41 wherein the network look-up table is a memory indexed by the bus index.

43. The system of claim 40 wherein the circuit further comprising:
a cell queue to transmit data to the network interface; and
a cell queue selector coupled to the bus index generator and the bus to select the cell queue corresponding to the source identifier.

44. An apparatus for interfacing between a network interface and a bus, the apparatus comprising:
means for forming a first network address of a first message transferred via the network interface to the bus; and
means for mapping the network address to a first bus address of the bus, the first bus address being within an address space occupied by a bus device coupled to the bus, the means for mapping comprising means for providing the first bus address; wherein the means for providing the first bus address is a memory indexed by a compressed index, the compressed index being formed by bits selected from the first network address.

45. The apparatus of claim 44 wherein the first bus address includes a base address and a first connection identifier.

46. The apparatus of claim 45 wherein the means for forming the first network address comprises:
means for extracting a destination identifier from the first message; and means for merging the extracted destination identifier with a physical device number to generate the first network address, the physical device number corresponding to the bus device.

47. The apparatus of claim 46 wherein the means for extracting the destination identifier extracts at least one identifier from a header of the first message, the at least one identifier corresponding to the destination identifier.

48. The apparatus of claim 44 further comprising:

means for receiving data from the bus.

49. The apparatus of claim 45 further comprising:

means for forming a bus index from a second bus address of the bus; and means for mapping the bus index to a second network address of a second message transferred via the network interface from the bus.

50. The apparatus of claim 49 wherein the means for forming the bus index extracts a source identifier and a second connection identifier from the second bus address to generate the bus index.

51. The apparatus of claim 49 wherein the means for mapping the bus index comprises:

means for providing the second network address.

52. The apparatus of claim 51 wherein the means for providing the second network address is a memory indexed by the bus index.

53. The apparatus of claim 51 wherein the network address includes a physical device number and at least one identifier.

54. The system of claim 33 wherein the first bus address includes a base address and a first connection identifier.

* * * * *